Patented Aug. 6, 1940

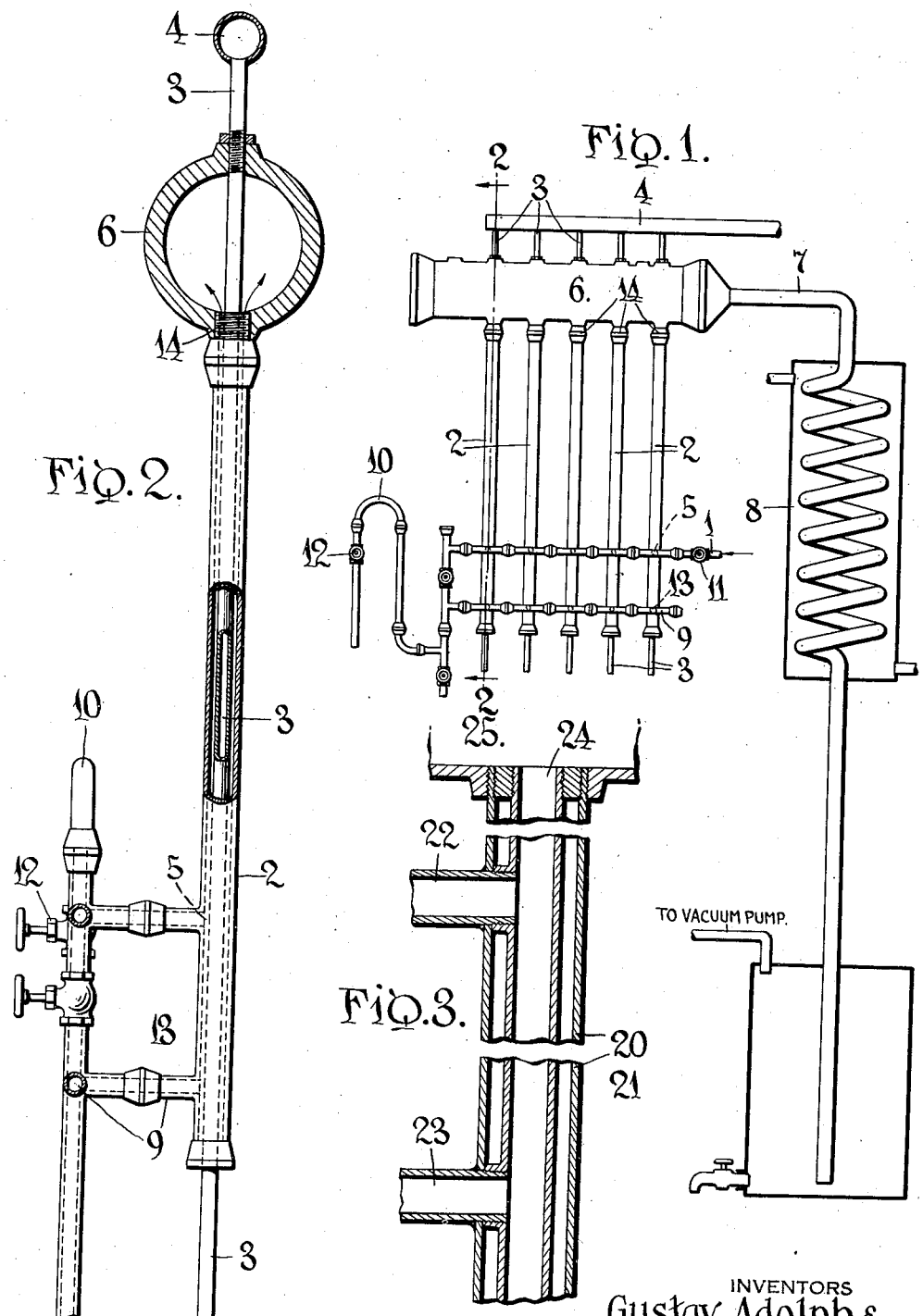

2,210,438

UNITED STATES PATENT OFFICE 2,210,438

PROCESS FOR DISTILLATION OF HYDROGEN PEROXIDE

Gustav Adolph, Solln, Germany, and Max E. Bretschger, Buffalo, N. Y., assignors to Buffalo Electro-Chemical Company, Inc., Buffalo, N. Y.

Application July 26, 1937, Serial No. 155,618

4 Claims. (Cl. 23—207)

This invention relates to a method of and apparatus for the production of hydrogen peroxide from solutions containing persulfate or persulfuric acid.

In general practice hydrogen peroxide is manufactured from solutions containing persulfates or persulfuric acid by vacuum distillation almost exclusively performed in tubes.

Where the distilling operation is performed in tubes or vaporizers arranged in a vertical position, the tubes being heated externally, the solution is added either at the top and permitted to trickle down the wall of the tubes in a thin layer, leaving the lower end of the tube in a condition wherein the acid has been concentrated and the hydrogen peroxide more or less distilled out, or the liquid to be distilled is taken into the tube at the lower end by means of vacuum and leaves the upper end of the tube after giving off a part of its available oxygen as hydrogen peroxide. In this type of distillation the vapors produced may flow in the same direction as the solution, in concurrent operations, or in a direction opposite the flow of the distilling solution, in countercurrent operations, or in a combination of the two. In general, in the prior practices used for the distillation of persulfates and persulfuric acid containing solutions, where distillation was performed in vertically arranged tubes, external heating was generally employed, while for horizontally arranged tubes internal or external heating was used.

In general, it has been found heretofore preferable to arrange the distilling tubes in a vertical position since considerable saving in space is effected. With such an arrangement feeding of the solution to the tubes from the bottom instead of from the top offers the advantage of greater evaporating capacity. In the case known thus far in patent literature where such a working operation is employed, the solution to be distilled enters from below into externally heated tubes, is then first concentrated in order to cause a considerable development of steam at the very small exposed surface of the liquid column. The mixture of steam and liquid thus developed in the lower part of the tube flows upwardly and both leave the upper end of the tube. Means must then be provided for separating the evolved water and hydrogen peroxide vapors and the ejected concentrated solution.

It is an object of the present invention to provide a distilling procedure for persulfate and persulfuric acid containing solutions with the production of hydrogen peroxide whereby the solution to be distilled is fed into vertical tubes adjacent the bottom of the tube while the developed hydrogen peroxide is discharged at the upper end of the tube and the concentrated solution discharged adjacent the lower end of the tube, but below the intake for fresh solution.

It is a further object of the invention to provide a procedure for distilling hydrogen peroxide from solutions containing persulfates or persulfuric acid in vertical tubes whereby it is possible to enlarge considerably the surface of the tube wall flooded with the distilling solution.

As another object of the invention it is designed to provide a distilling procedure in vertical tubes whereby a considerable shift in the concentration of sulfuric acid and available oxygen is made in the distilling solution whereby the liquid leaving the lower end of the tube is substantially entirely distilled out and the remaining content of available oxygen considerably lower than has been possible of obtainment heretofore in discharging the concentrated solution from the lower end of vertical distilling tubes.

In the drawing

Fig. 1 is a side elevation of an apparatus suited for carrying out the present process, Fig. 2 is an enlarged vertical section substantially on line 2—2 of Fig. 1 showing an internally heated tube and connections, while Fig. 3 is a still further enlarged fragmentary vertical section of an externally heated distilling tube.

Referring more specifically to the drawing, the liquid containing persulfate or persulfuric acid is fed into intake tubes 1 from suitable electrolytic cells, the intake having fluid communication with the vertical distilling or vaporizer tube 2. Placed concentrically in the vaporizing tube 2 is a heating tube 3 running substantially the full length of the vaporizer tube and having fluid communication with a steam inlet tube 4. Upon entrance of the solution to be distilled into vaporizer tube 2, the solution is heated and evaporates vigorously along the entire heating surface above the point of intake at 5. The developed steam causes the evaporating liquid to move upwardly in the tube so that the heating surface is covered substantially uniformly at all parts by a film of the evaporating liquid. As the solution is evaporated and steam and hydrogen peroxide generated, its gravity increases and the solution tends to flow to the lower part of the tube.

The vaporizer tube 2 has fluid communication at its upper end with a header member 6 into which the vapor generated in the space between the heating tube 3 and the vaporizer 2 is discharged together with a small amount of the distilling liquid. These vapors of steam and hydrogen peroxide are withdrawn from header member 6 by means of connection 7 and are condensed in any suitable form of condenser 8, the header member and tubes being maintained under a vacuum.

As the distilling liquid is concentrated, the heavier concentrated portion tends to flow downwardly counter to the lighter portions of the liquid and at a point below the intake 5 fluid communication is had with a discharge tube 9 connected with a siphon tube 10 whereby the concentrated material is readily removed from the lower part of vaporizer tube 2.

Suitable valves are provided at 11 in the intake 1 and at 12 in siphon tube 10 to regulate the flow of liquid and rate of distillation.

The distillation will generally be performed in several tubes and in Fig. 1 a plurality of distilling or vaporizing tubes 2 is illustrated connected at 5 with the common intake 1, at 13 to the common discharge 9, and at 14 to the common header 6. Heating tubes 3 are placed concentrically in the vaporizer tubes 2, extending through header 6 and having fluid communication with a common intake 4 or source of heating medium, generally steam.

It will be understood, that good performance of the distillation depends largely upon the difference in distance between the outer surface of the heating tube 3 and the inner surface of the jacket or vaporizer tube 2. This distance will be governed by the specific gravity of the acid solution fed to the tube and to the quantity of the developed steam. Once these factors are determined, good performance is obtained, depending upon the kind of material of which the tubes are composed and upon size of the surface used.

Although internally heated tubes are preferred in carrying out the procedure, externally heated tubes may be used and in Fig. 3 there is shown a concentric arrangement of external heating tubes 20, internal vaporizer or distilling tube 21 having fluid communication with liquid intake feed pipe 22 and liquid discharge pipe 23 for concentrated material, located at a position adjacent the lower end of tube 20 and below the point of intake and having a discharge 24 into a header member 25. As the procedure of operation is substantially the same for externally heated tubes as for internally heated tubes, no extended discussion of the procedure and apparatus will be made as it is believed such operations will be readily understood by reference to the description hereinabove set forth relating to internally heated tubes.

From the foregoing it will be seen that the present invention provides a method for distilling solutions containing persulfates and persulfuric acid in heated substantially vertically positioned vaporizing tubes whereby the solution to be distilled is added at a point below the middle of the tube but above the discharge point of the tube, while the developed vapors and concentrate are separately withdrawn from the tube, the vapors being discharged at the upper end of the tube, while the concentrate is withdrawn at a point adjacent the lower end of the tube and below the intake or feed for fresh liquor.

What is claimed is:

1. The process for the production of hydrogen peroxide from solutions containing persulfate or persulfuric acid by vacuum distillation in a heated tube arranged substantially vertically, which comprises introducing fresh solution into heated concentrated solution contained in the lower portion of the tube but above the liquid discharge, discharging the formed vapors at the upper end of the tube and the concentrate adjacent the lower end thereof and below the point at which fresh liquid is added thereto and out of contact with the heating medium.

2. The process for the production of hydrogen peroxide from solutions containing persulfate or persulfuric acid by vacuum distillation in a heated tube arranged substantially vertically, which comprises introducing fresh solution into heated concentrated solution contained in the lower portion of the tube but above the liquid discharge, heating the tube internally, discharging the formed vapors at the upper end of the tube and the concentrate adjacent the lower end thereof and below the point at which fresh liquid is added thereto and out of contact with the heating medium.

3. The process for the production of hydrogen peroxide from solutions containing persulfate or persulfuric acid by vacuum distillation in a heated tube arranged substantially vertically, which comprises introducing fresh solution into heated concentrated solution contained in the lower portion of the tube but above the liquid discharge, heating the tube externally, discharging the formed vapors at the upper end of the tube and the concentrate adjacent the lower end thereof and below the point at which fresh liquid is added thereto and out of contact with the heating medium.

4. The process for the production of hydrogen peroxide from solutions containing persulfate or persulfuric acid by vacuum distillation in a tube arranged substantially vertically, which comprises introducing fresh solution into heated concentrated solution contained in the lower portion of the tube but above the liquid discharge, heating the tube and contained liquid and vapor and separately discharging the formed vapor and liquid from the tube, said vapor and liquid not being in contact with the heating medium.

GUSTAV ADOLPH.
MAX E. BRETSCHGER.